United States Patent [19]
Blewett et al.

[11] 3,859,236
[45] Jan. 7, 1975

[54] STABILIZED VINYL HALIDE POLYMER COMPOSITIONS

[75] Inventors: Charles W. Blewett, Ft. Mitchell, Ky.; Philip H. Rhodes, Cincinnati, Ohio

[73] Assignee: Emery Industries, Inc., Cincinnati, Ohio

[22] Filed: Apr. 19, 1973

[21] Appl. No.: 352,599

[52] U.S. Cl. ...... 260/23 XA, 106/15 R, 106/15 AF, 260/45.7 R, 260/45.75 R, 260/45.8 R, 260/429.7, 260/429.9
[51] Int. Cl. ...................... C08f 19/14, C08f 21/04
[58] Field of Search ............. 260/23 XA, 45.7, 45.8, 260/45.75, 429.9, 447; 106/15

[56] References Cited
UNITED STATES PATENTS

| | | |
|---|---|---|
| 3,304,288 | 2/1967 | King ................................ 260/429.9 |
| 3,547,818 | 12/1970 | Wade ............................... 260/429.9 |
| 3,697,463 | 10/1972 | Oakes ............................ 260/23 XA |
| 3,759,856 | 9/1973 | Rhodes ......................... 260/23 XA |

*Primary Examiner*—Melvyn I. Marquis
*Assistant Examiner*—William E. Parker
*Attorney, Agent, or Firm*—John D. Rice; G. A. Baracka

[57] ABSTRACT

Vinyl halide resin compositions are stabilized with bivalent metal glyceroxides. Vinylchloride homopolymers and copolymers stabilized with zinc glyceroxide are a particularly important aspect of the present invention. The use of metal glyceroxides makes it possible to increase the metal content in the polymer while employing a small amount of the metal stabilizer compound.

8 Claims, No Drawings

STABILIZED VINYL HALIDE POLYMER COMPOSITIONS

BACKGROUND OF THE INVENTION

Vinyl halide resins and more particularly vinylchloride homopolymers and copolymers are used extensively throughout the plastics industry in numerous applications. The polymers are, however, subject to thermal, photochemical and oxidative degradation which greatly reduces the mechanical properties of the resins and also affects their clarity and color. If useful vinyl halide compositions are to be obtained the resins must be stabilized to prevent such degradation.

Thermal decomposition, which is believed to be the result of dehydrohalogenation of the polymer, is particularly troublesome with these polymers. Metallic salts of inorganic acids and organic acids, including the barium, cadmium, calcium, lead, potassium, sodium, strontium and zinc salts, have been used extensively to stabilize vinyl halide polymers, especially polyvinyl chloride (PVC), against thermal degradation. One commonly held view is that the metal salts function as acceptors of the hydrogen chloride evolved and thus prevent subsequent ionic reactions which could lead to breakdown of the polymer. Zinc soaps of fatty acids are particularly useful in these applications because of their effectiveness and nontoxicity which makes them suitable for food packaging applications and low cost.

It would be highly desirable and advantageous if metallic compositions containing a high weight percentage of the metal were available and if these compositions were useful stabilizers for PVC resins. It would be even more useful if these compositions exhibited low solubility in water and various organic solvents so that they would not be readily extracted from the resin compositions by the action of these solvents. It would be particularly advantageous if zinc compositions containing greater than about 40 percent by weight zinc were available which were suitable as stabilizer additives for PVC so that even with small amounts of the additive the level of the zinc in the resin would be adequate to provide acceptable stabilization.

SUMMARY OF THE INVENTION

We have now found that glyceroxides of certain bivalent metals are highly effective stabilizers for vinyl halide resins. These glyceroxides are advantageous because of their high metal content thus making it possible to achieve the desired concentration of the metal in the resin while using only a small amount of the glyceroxide additive.

The useful glyceroxides of this invention are glyceroxides of bivalent metals such as barium, calcium, cadmium, lead, zinc and tin having the empirical formula $C_3H_5O_3Me$. The metal content of these glyceroxides is between about 40 to 50 percent by weight. Zinc glyceroxide and tin glyceroxide are especially preferred compounds of this invention particularly when employed as stabilizers for vinyl chloride homopolymers and copolymers. The glyceroxides are used at levels so that about 0.005 to 3 percent by weight of the metal is present in the compounded resin. The metal glyceroxides are especially effective if employed in combination with an epoxy compound, preferably epoxy higher esters such as the epoxidized naturally occurring oils.

DETAILED DESCRIPTION

The present invention relates to vinyl halide resin compositions derived from one or more halogen-containing vinyl monomers. In general, the vinyl halide polymers useful in the present invention are obtained by the polymerization of vinyl chloride, vinyl bromide, vinylidene chloride and vinylidene bromide but may additionally contain other polymerizable vinyl monomers including lower allyl esters; vinyl acetate; vinyl alkyl ethers; acrylic and methacrylic esters such as ethyl acrylate, methyl acrylate and methyl methacrylate; acrylic acid and methacrylic acid; acrylonitrile and methacrylonitrile; and the like. Particularly useful copolymer compositions are obtained by the copolymerization of vinyl chloride with vinyl acetate, vinyl chloride with vinyl butyrate, vinyl chloride with methyl acrylate, vinyl chloride with 2-ethylhexyl acrylate and vinyl chloride with mixtures of vinylidene chloride and 2-ethylhexyl acrylate. Homopolymers and copolymers as described above are stabilized in accordance with the present invention or blends of the above-mentioned polymer compositions with other polymer systems such as butadiene-styrene copolymers, butadiene-acrylonitrile copolymers, acrylonitrile-butadiene-styrene terpolymers, chloroprene polymers, and the like, may also be utilized in accordance with the present invention. PVC homopolymers and PVC copolymers stabilized with Group II b metal glyceroxides are a particularly important aspect of this invention especially where the polymer is derived from 80 percent or more (by weight) vinyl chloride. Zinc glyceroxide and tin glyceroxide stabilized PVC polymers are an especially preferred embodiment of this invention.

Useful stabilizer compositions employed in conjunction with the aforementioned vinyl halide resins are glyceroxides of bivalent metals such as barium, calcium, cadmium, lead, zinc and tin and have the empirical formula $C_3H_5O_3Me$ where Me is the bivalent metal. These glyceroxides are formed by the reaction of glycerine with a compound of the metal, preferably a metal salt, at elevated temperatures. For example, zinc glyceroxide is obtained in a highly pure state by fusion of glycerine and a zinc compound such as zinc carbonate, zinc oxide and zinc acetate at a molar ratio of 1:1 or higher. Excess glycerine may be employed in the reaction to provide a suitable reaction medium. The metal glyceroxides are believed to be complex high molecular weight, polymeric materials containing a plurality of —Zn—O— covalent linkages and from about 40 to 50 percent by weight metal. They are insoluble in water and most organic solvents, in addition to being high melting materials. The zinc and tin glyceroxides are particularly effective stabilizer compounds for use with PVC polymer resins.

The bivalent metal glyceroxides are used in amounts so that between about 0.005 and about 3 percent by weight of the metal is present in the compounded resin. At these levels, especially when employed in conjunction with other suitable stabilizing and compounding ingredients, exceptionally useful resins adaptable for a wide variety of applications are obtained. More typically, the metal glyceroxide is employed at a level so that the resin contains from about 0.01 to about 1.0 percent by weight of the metal. Because of the high metal content of the metal glyceroxides it is possible to achieve acceptable weight levels of the metal in the resin composition utilizing very small amounts of the metal glyceroxide. This is advantageous for economic reasons and also because it is less likely that the physical properties of the resin will not be adversely affected when small amounts of stabilizer additives are utilized.

It has been found particularly useful if epoxy compounds, which function as plasticizers and stabilizers, are used in conjunction with the metal glyceroxides. The useful epoxy compounds contain one or more epoxy groups per molecule and may be either aliphatic, cycloaliphatic, aromatic or heterocyclic compounds containing from 10 to about 180 carbon atoms. Preferably, aliphatic or cycloaliphatic compounds containing from about 20 to 150 carbon atoms are used with the metal glyceroxides. Particularly useful epoxy compounds are the epoxy higher esters such as those derived from unsaturated alcohols and/or unsaturated acids which are epoxidized at the site of unsaturation. The unsaturated acid or alcohols may be epoxidized prior to the esterification or the ester formed and then epoxidized. Typical unsaturated acids useful for the preparation of these esters include oleic, linoleic, linolenic, erucic and ricinoleic acids. These may be esterified with monohydric and polyhydric alcohols or mixtures thereof. Useful monohydric alcohols include butanol, 2-ethylhexanol, octanol, isooctanol, lauryl alcohol, oleyl alcohol, stearyl alcohol and the like. Polyhydric alcohols may include pentaerythritol ethylene glycol, 1,2-propylene glycol, 1,4-butylene glycol, neopentyl glycol, glycerol, mannitol, sorbitol, ricinoleyl alcohol and the like. When polyhydric alcohols are used the epoxy compounds may be complete or partial esters.

Especially useful epoxy higher ester compounds are epoxidized naturally occurring oils. These are mixtures of epoxidized primarily higher fatty acid triglycerides. Suitable oils include epoxidized soybean oil, epoxidized olive oil, epoxidized cottonseed oil, epoxidized coconut oil, epoxidized tallow, epoxidized tall oil fatty acid esters and the like. In an especially preferred embodiment of the present invention epoxidized soybean oil and zinc glyceroxide are used in PVC resins. The epoxidized oils are obtained using known epoxidation methods such as the formic acid and sulfuric acid processes employing conventional epoxidizing agents.

It is customary to use at least 3 weight percent epoxy compound based on the resin, however, larger amounts will generally be employed. The epoxy compound may be as high as 100 percent by weight. Preferably, the amount of epoxy compound will range between about 5 and 20 percent when zinc glyceroxide is used within the limits previously described.

The metal glyceroxides are readily worked into the vinyl polymers employing conventional mixing techniques. They may be incorporated into the resin by kneading, milling or mixing with a Banbury or ribbon mixer and no special processing is required. They may be used immediately after preparation or stored, as such or in a masterbatch without loss of activity. The metal glyceroxide may be added to the resin as a solid in any suitable form or as a solution, emulsion or dispersion. Since the metal glyceroxides are not readily soluble in many of the conventional solvents employed for this purpose it is generally convenient to prepare an emulsion or dispersion which may also contain additional compounding ingredients. It may be advantageous to use the epoxy compound for this purpose, i.e. as the dispersing agent or carrier for the metal glyceroxide and other additives.

Other known compounding ingredients which can be used with the metal glyceroxide include plasticizers, antioxidants and stabilizers, pigments and colorants, fillers, lubricants, antisticking agents, processing and extrusion aids, and the like. Any of these additional ingredients may be included in the masterbatch or they may be individually added to the resin. Common plasticizer agents are often useful with the epoxy compounds and metal glyceroxide to modify the resin properties. These may be the primary or secondary plasticizer for the resin and may also have some stabilizer affect. These compounds include common plasticizer agents such as dioctyl phthalate, diisooctyl phthalate, dioctyl adipate, trioctyl phosphate, epoxidized monocarboxylic acids, glycidyl ethers of polyhydric alcohols and phenols, epoxy polyethers or polyhydric phenols and various other polymerics.

While not essential to obtain useful resin compositions, other stabilizer components may be advantageously employed with the metal glyceroxides. It is common practice when formulating PVC resins to employ such supplemental stabilizers since it is generally accepted that no single stabilizer will meet all end use requirements and satisfactorily prevent the deleterious affects of oxygen, heat and light. Small amounts of such supplemental stabilizers will often markedly improve the resin properties and may even function synergistically with the metal glyceroxides. The total amount of supplemental stabilizers will not generally exceed about 10 percent by weight of the vinyl halide resin and is more usually less than 4 percent. Such supplemental stabilizers might include light stabilizers derived from benzophenone and its derivatives, such as 2,2'-dihydroxybenzophenone and 2-hydroxybenzophenone. Other stabilizers derived from benzotriazoles, benzotriazines and phenylsalicylates may also be employed. Phenolic type antioxidants such as the hindered phenols containing one or two alkyl groups, preferably tertiary alkyl groups immediately adjacent to the hydroxyl group on the aromatic nucleus, are also useful for this purpose. Phenolic stabilizer compounds include phenol, resorcinol, catechol, cresol, 2,6-di-t-butyl phenol, 2,6-di-t-butyl-p-cresol, 2,2-bis(4-hydroxyphenyl) propane, methylene bis(2,6-di-t-butylphenol), methylene bis(p-cresol) and the like. Polyvalent metal salts of substituted phenols such as polyvalent metal phenolates are also effective stabilizers and may be advantageously employed. Similarly, various aromatic amines and their derivatives which are known to function as antioxidants may be used.

While any of the above compounds generally recognized to have stabilizer or antioxidant activity may be used, either individually or in combination, with the metal glyceroxides it has been found that certain organophosphorous stabilizer compounds give particularly useful results. The useful organophosphorous compounds are phosphites containing at least one —O—R group bonded to a phosphorous atom. The R group is a hydrocarbon radical containing from about 1 to 24 carbon atoms such as an aryl alkyl, alkaryl, aralkyl and cycloalkyl group or a heterocyclic group. More preferably R is a hydrocarbon radical containing from 6 to 20 carbon atoms. Useful phosphites of this type are represented by the general formula:

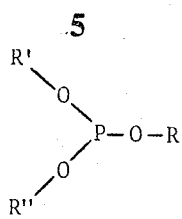

wherein R is one of the above defined groups and R' and R" are hydrogen or a radical as defined for R. The R groups may be the same or they may differ. Phosphite stabilizer compounds of the above type include monophenyl phosphite, diphenyl phosphite, triphenyl phosphite, tricresyl phosphite, tri(octylphenyl) phosphite, tri(p-tert-nonylphenyl) phosphite, tri(nonylphenyl) phosphite, tribenzyl phosphite, tri(2-cyclohexyl) phosphite, tricyclohexyl phosphite, tricyclopentyl phosphite, tri(tetrahydrofurfuryl) phosphite, monoisooctyl phosphite, diisooctyl phosphite, triisooctyl phosphite, tridodecyl phosphite, diisooctyl phenyl phosphite, diphenyl decyl phosphite, isooctyl diphenyl phosphite, tri(2-ethylhexyl) phosphite and the like. Also useful are phosphite compounds wherein R' and R" join to form ring systems illustrated in the formulae:

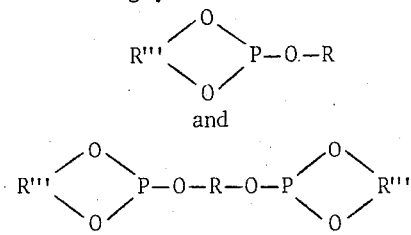

wherein R''' is a bivalent hydrocarbon radical and R is a monovalent radical, as previously defined, or a divalent radical derived therefrom. Triphosphites, that is, where R, R' and R" are all hydrocarbon radicals, give especially useful results when included in the resin formulation with zinc glyceroxide and an epoxy compound. Tri(alkaryl) phosphites are especially preferred with tri(nonylphenyl) phosphite being especially useful since this phosphite is approved for use in polyvinyl chloride resin films for food packaging applications.

These and other advantages exhibited by the metal glyceroxides of this invention will be further understood by reference to the following examples which illustrate various methods of their production and their advantageous use as stabilizers, alone or in combination with other known compounding ingredients, to produce vinyl halide resin compositions suitable for a wide variety of applications. The examples are not intended to be limiting and variations and modifications of the invention will be obvious to the person skilled in the art from a reading thereof. In the examples all parts and percentages are on a weight basis unless otherwise indicated.

To demonstrate the heat stability imparted to the resin compositions through the use of the metal glyceroxides, stabilized sheets of the resin were prepared by blending the additives and milling them into the resin at about 350°F for about 5 minutes with continuous working. A conventional two-roll mill was employed. The 30–40 mil sheets were removed from the rolls and cooled and 1 × 1 inch squares stamped therefrom and arranged on a series of eight glass trays (1½ × 10 inches) which are fitted in a rotating device (ferris wheel type) in an electric oven maintained at 375°F. After starting the test, a single glass slide was removed at 10 minute intervals. After allowing to cool the test specimens were removed from the glass tray and observed for discoloration and other signs of polymer degradation. The testing is terminated when all the samples fail but in any event after 80 minutes.

EXAMPLE I

Zinc glyceroxide was prepared by heating a mixture of 21.9 gms (0.1 mol) of zinc acetate dihydrate and 275 gms glycerine (Emery 916 99.5% CP/USP Glycerine) with stirring at 160°C for 6 hours under a nitrogen atmosphere. The reaction mixture was then filtered and the residue washed with water and vacuum dried to give 14.6 gms of a white powder. The zinc glyceroxide was characterized by infrared and analytical analysis. The compound contained 46.8 percent bound zinc and the infrared spectra showed the following typical identifying bands: 1942 $cm^{-1}$(s), 1355 $cm^{-1}$(w), 1275 $cm^{-1}$(w), 1240 $cm^{-1}$(w), 1125 $cm^{-1}$(vs), 1065 $cm^{-1}$(vs), 990 $cm^{-1}$(vs), 910 $cm^{-1}$(m) and 875 $cm^{-1}$(s). There was no absorption in the 3600–3200 $cm^{-1}$ region indicating the absence of free hydroxyl groups.

EXAMPLE II

The preparation of zinc glyceroxide from zinc carbonate was conducted as follows: To 150 gms glycerine maintained at 200°C under nitrogen, 25 gms zinc carbonate was added over a period of about 1 hour. When the addition was completed the reaction mixture was cooled, diluted with 150 mls of water and filtered. The precipitate was washed with water, vacuum dried to obtain 31.5 gms zinc glyceroxide containing 46.6 percent zinc.

EXAMPLE III

Zinc glyceroxide was prepared from 16.2 gms (0.20 mol) zinc oxide and 150 gms glycerine by heating to 220°C and stirring for about 1 hour under nitrogen. The precipitate obtained after cooling and diluting with 100 mls water was recovered by filtration and vacuum dried. A white powder (28.7 gms) containing 44.2 percent zinc was obtained. The zinc glyceroxide was further identified by the infrared spectra.

EXAMPLE IV

Similar to Example III a mixture of 81 gms (1.0 mol) zinc oxide and 92 gms (1.0 mol) glycerine was heated at 220°C under nitrogen. The reaction was continued for 4 hours and then terminated by allowing to cool and diluting with water. The white solid product recovered contained 44.4 percent zinc by analysis and was identified as zinc glyceroxide.

EXAMPLE V

Employing similar procedures to those described above other metal glyceroxides of metals including calcium, lead and tin were prepared. For example, tin glyceroxide was obtained by heating 0.2 mol tin oxide and 1.63 mols glycerine at 220°C for 3 hours under nitrogen. The product contained 66.5 percent tin. When 0.6 mol tin oxide and 4.89 mols glycerine were reacted for 7 hours at 220°C an identical product containing 66.3 percent bound tin and identified as tin glyceroxide was obtained.

EXAMPLE VI

Zinc glyceroxide obtained from the reaction of zinc acetate with glycerine as described in Example I was incorporated in the following general purpose polyvinyl chloride resin formulation:

| | |
|---|---|
| Polyvinyl Chloride Homopolymer (Diamond Shamrock 450) | 100 parts |
| Dioctylphthalate | 45 parts |
| Zinc Glyceroxide | 0.04 part |
| Stearic Acid | 0.5 part |
| Epoxidized Soybean Oil | 5 parts |
| Diphenyldecylphosphite | 1.0 part |

The additives were blended and milled into the resin. The sheets obtained from the mill were clear and water white. The resin samples stabilized with the zinc glyceroxide withstood the 80 minute heating at 375°F and even after this time there was only minor discoloring (yellowing). There was no appreciable yellowing until about 60–70 minutes into the testing.

EXAMPLE VII

To demonstrate the effectiveness of the zinc glyceroxides to function as heat stabilizers at significantly reduced weight levels a comparative test was conducted employing the same general purpose resin formulation described in Example VI except that 0.2 parts zinc stearate, a well-known commercially available and commonly used zinc stabilizer compound, was substituted for the zinc glyceroxide. The resin of this Example contained an equivalent level of zinc metal compared to the resin of Example VI. Subjecting the resins to identical heat stability testing there was no appreciable difference between these resins and those of Example VI. This is significant in view of the much smaller amount of zinc glyceroxide employed in Example VI as compared to zinc stearate in Example VI since this results in considerable economic advantage while achieving the same results. It should be noted that the use of lower levels of the zinc stabilizer compound is also more desirable since it is less likely to detract from the overall physical properties of the final resin.

EXAMPLE VIII

A food film formulation was prepared in accordance with the following recipe:

| | |
|---|---|
| Polyvinyl Chloride Homopolymer (Diamond Shamrock 450) | 100 parts |
| Dioctylphthalate | 20 parts |
| Epoxidized Soya | 10 parts |
| Stearic Acid | 0.5 part |

Using the above formulation two resin compositions were prepared which contained equivalent zinc metal contents even though the sources of the zinc were different. In one formulation 0.082 parts zinc glyceroxide was added with 2.92 parts of a diester triglycerol and mixed 8–10 straightchain fatty acids while to the other resin was added 0.082 parts zinc chloride, 0.082 parts water and 2.84 parts of the triglycerol diester. Even though both resins contained equivalent zinc metal contents, the resin containing zinc chloride blackened after only 40 minutes, whereas the resin stabilized with zinc glyceroxide showed only minor yellowing even after 50 minutes and did not blacken until about 80 minutes.

EXAMPLE IX

When 25 parts calcium carbonate was included as a filler in the resins of Example VI water white opaque films having good flexibility were obtained. The samples showed good heat stability and had not blackened even at the end of the 80 minute test period. There was, however, some discoloration after about 60 minutes.

EXAMPLE X

A resin formulation suitable for food film usage was prepared in accordance with the following recipe:

| | |
|---|---|
| Polyvinyl Chloride Homopolymer (Diamond Shamrock 450) | 100 parts |
| Dioctyladipate | 18 parts |
| Epoxidized Soya | 9 parts |
| Stearic Acid | 0.5 part |
| Diester of triglycerol and mixed $C_{8-10}$ straight-chain fatty acids | 2 parts |
| Zinc Glyceroxide* | 0.05 part |

*Obtained by the reaction of glycerine and zinc carbonate as in Example II.

The resin formulation showed good heat stability through 60 minutes of oven ageing. The sample began to brown after about 70 minutes. When the amount of zinc glyceroxide was reduced to 0.025 part in the above formulation the heat stability of the resin was markedly improved and even after 80 minutes only slight yellowing of the samples was observed.

Similar results were obtained when a portion of the zinc glyceroxide was replaced with calcium glyceroxide obtained from the reaction of calcium hydroxide and glycerine. Acceptable stabilization was achieved when such combination of metal glyceroxides were employed. The resins would be suitable for food film formulation.

EXAMPLE XI

A stabilized general purpose resin was prepared in accordance with the following formulation:

| | |
|---|---|
| Polyvinyl Chloride Homopolymer (Diamond Shamrock 450) | 100 parts |
| Dioctylphthalate | 45 parts |
| Epoxidized Soya | 5 parts |
| Stearic Acid | 0.5 part |
| Diphenyldecylphosphite | 1 part |
| Zinc Glyceroxide | 0.025 part |

The compounded resin showed good heat stability through 60 minutes oven ageing. After about 70 minutes slight discoloration began to occur and brown spots were visible in the sample, probably due to poor dispersion of the additives in the resin.

EXAMPLE XII

A rigid, general purpose, food grade formulation modified with an impact improver was prepared in accordance with the following recipe:

| | |
|---|---|
| Polyvinyl Chloride Homopolymer (Diamond Shamrock 40) | 100 parts |
| Acrylic Impact Modifier (Rohm and Haas KM-636) | 13 parts |
| Polymeric Processing Aid (Rohm and Haas K-120-N) | 2 parts |
| Long-Chain Fatty Acid Lubricant | 0.5 part |
| Diphenyldecylphosphite | 1 part |
| Zinc Glyceroxide | 0.05 part |

Heat stability tests were conducted on the above resins and even after 80 minutes oven ageing the resins had not failed. After about 50 minutes yellowing began to occur and at 80 minutes the test specimens were yellowish-brown. Similar results were obtained when the diphenyldecylphosphite was replaced with 0.75 parts hydrogenated bisphenol A phosphite.

EXAMPLE XIII

To further demonstrate the utility of resins stabilized with the metal glyceroxides of this invention, food films were prepared in accordance with the formulation of Example X. Thin films of about 3 mil thickness were obtained and the antifogging properties of these films determined by stretching the film over a 250 ml beaker two-thirds full of water heated to 80°C. Such tests are commonly employed to measure antifogging properties of films. Films stabilized with zinc glyceroxide showed no fogging (condensation of water droplets on the film) when initially placed over the water or even after standing for 10 minutes. A similar film formulation containing 0.22 parts zinc stearate in place of the zinc glyceroxide developed some fogging when the film was initially placed over the beaker, however, the fog cleared in about 5 seconds.

EXAMPLE XIV

The formulation of Example IX was repeated employing 2.0 parts tin glyceroxide as the metal glyceroxide. Excellent stability was obtained. The stabilized resins withstood 60 minutes oven ageing with no sign of appreciable discoloration.

We claim:

1. A stabilized vinyl halide resin composition containing a bivalent metal glyceroxide in an amount so that about 0.005 to 3 percent by weight metal is present in the compounded resin, said bivalent metal glyceroxide having the empirical formula $C_3H_5O_3Me$ and containing 40–50 percent by weight bivalent metal selected from the group consisting of barium, calcium, cadmium, lead, zinc and tin.

2. The resin composition of claim 1 wherein the vinyl halide resin is a polyvinyl chloride homopolymer or polyvinyl chloride copolymer containing 80 percent or more vinyl chloride.

3. The resin composition of claim 1 additionally containing 3 weight % or more of an aliphatic, cycloaliphatic, aromatic, or heterocyclic epoxy compound containing from 10 to about 180 carbon atoms.

4. The resin composition of claim 3 wherein the epoxy compound is an epoxy higher ester containing from about 20 to 150 carbon atoms.

5. The resin composition of claim 4 wherein the epoxy compound is an epoxidized naturally occurring oil and constitutes about 5 to 20% by weight of the resin.

6. The resin composition of claim 5 wherein the epoxy compound is epoxidized soybean oil and the bivalent metal glyceroxide is zinc glyceroxide.

7. A stabilized vinyl halide resin composition comprising
   a. a polyvinyl chloride homopolymer or copolymer containing 80 percent or more vinyl chloride;
   b. zinc glyceroxide in an amount so that about 0.005 to 3 percent by weight zinc is present in the resin;
   c. 5 to 20 percent by weight epoxidized soybean oil; and
   d. an organophosphorous compound containing at least one —O—R group bonded to the phosphorous atom where R is a hydrocarbon radical selected from the group consisting of aryl, alkyl, alkaryl and cycloalkyl containing from 1 to 24 carbon atoms and a heterocyclic group.

8. The resin composition of claim 7 wherein the organophosphorous compound is a tri(alkaryl) phosphite.

* * * * *